No. 754,858. PATENTED MAR. 15, 1904.
T. A. EDISON.
STORAGE BATTERY TRAY.
APPLICATION FILED NOV. 28, 1902.
NO MODEL. 2 SHEETS—SHEET 1.
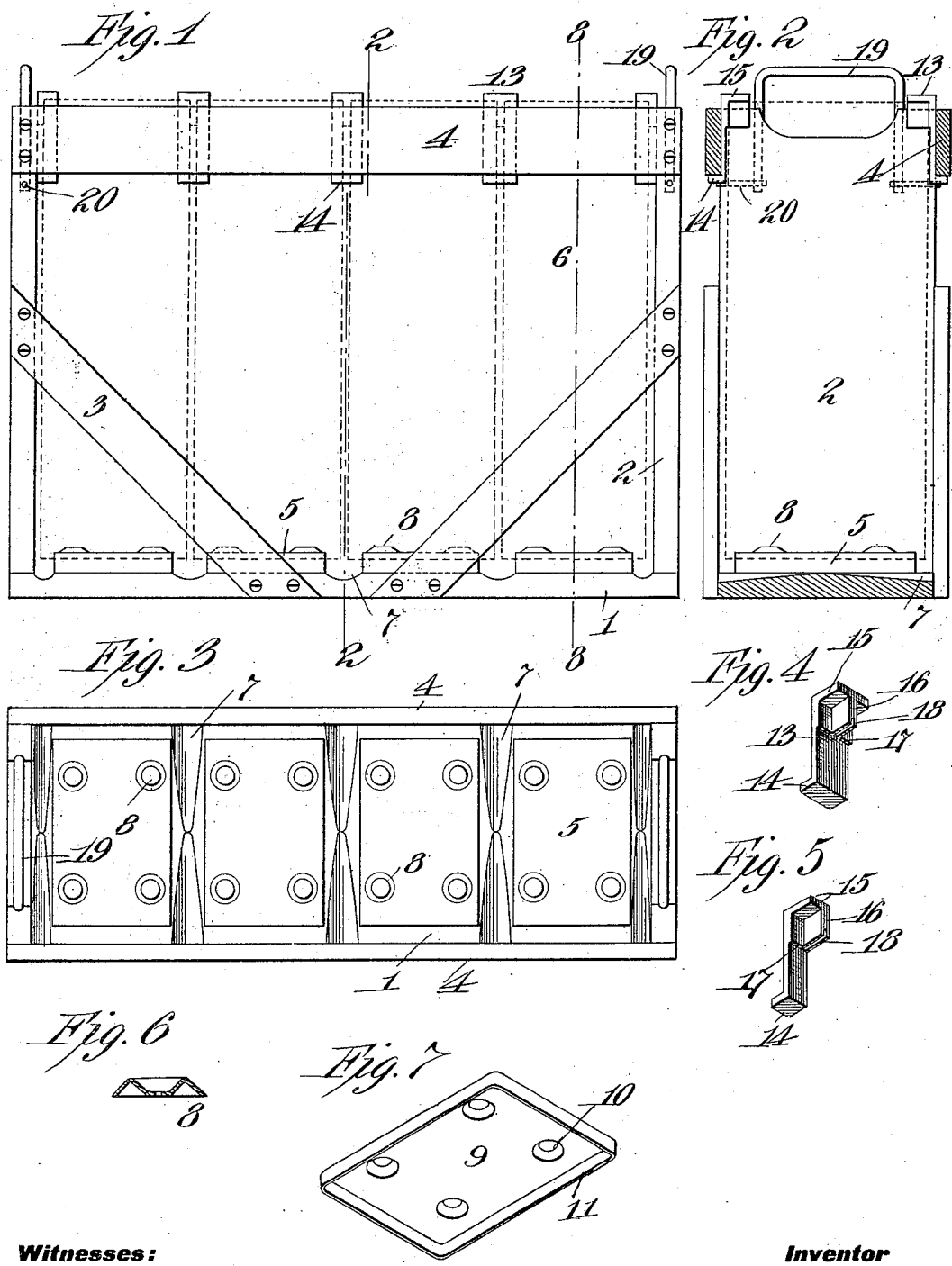
Witnesses:
Jas. F. Coleman
Jno. Robt Taylor
Inventor
Thomas A Edison
by Dyer Edmonds
Attorneys

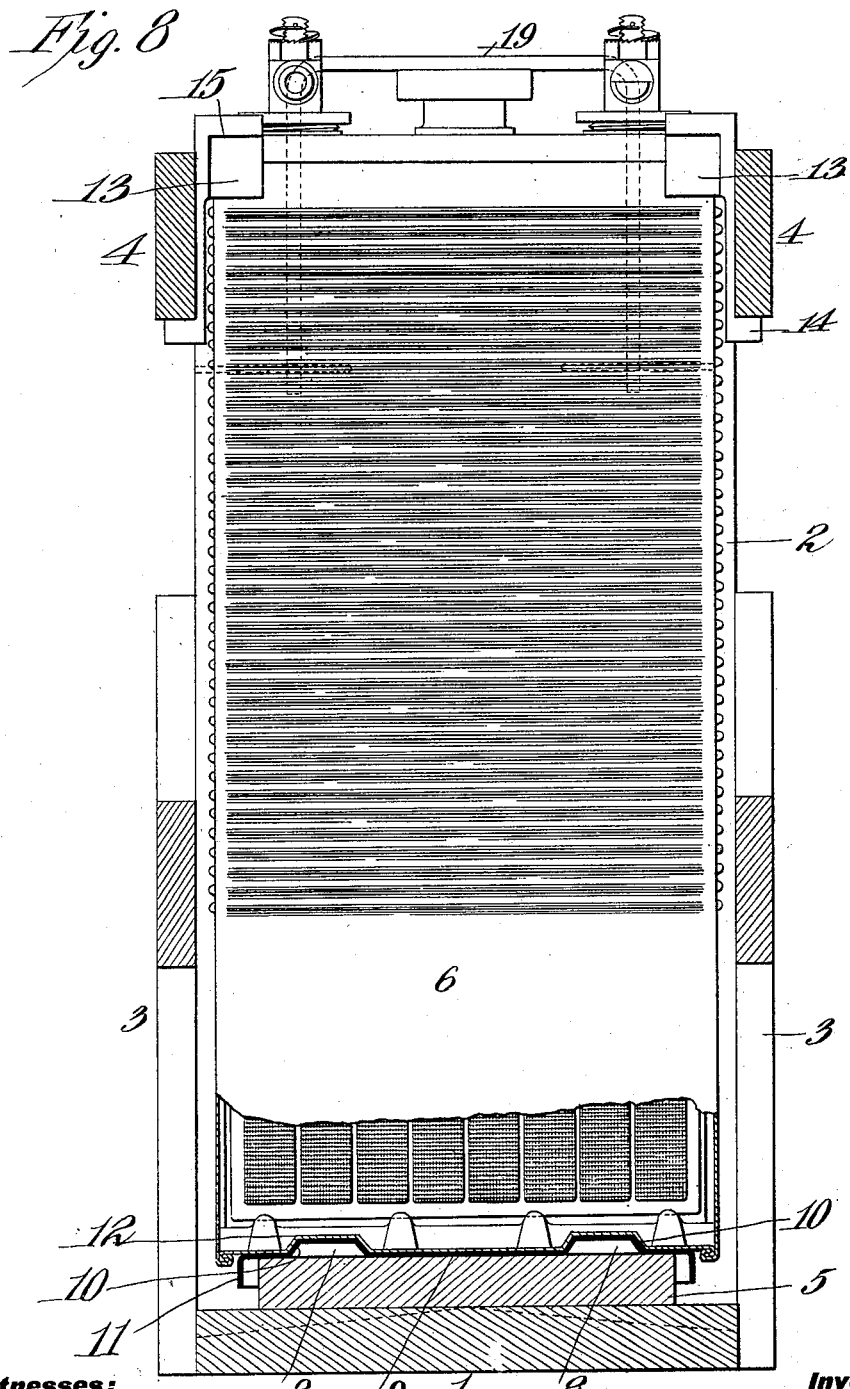

No. 754,858. Patented March 15, 1904.

UNITED STATES PATENT OFFICE.

THOMAS A. EDISON, OF LLEWELLYN PARK, NEW JERSEY, ASSIGNOR TO EDISON STORAGE BATTERY COMPANY, OF ORANGE, NEW JERSEY, A CORPORATION OF NEW JERSEY.

STORAGE-BATTERY TRAY.

SPECIFICATION forming part of Letters Patent No. 754,858, dated March 15, 1904.

Application filed November 28, 1902. Serial No. 133,114. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Storage-Battery Trays, of which the following is a specification.

My invention relates to an improved tray arranged to carry and securely hold together a series of storage batteries, so that by assembling a plurality of such trays with their contained cells a complete outfit will be produced adapted particularly for use with automobiles. Although the improved tray has been designed especially for use with storage batteries of the type invented by me employing an alkaline electrolyte and a nickel-plated can or receptacle, it will be understood that the invention may be effectively utilized in connection with reversible galvanic cells of any desired type.

My objects generally are to provide a tray for securing and holding any desired number of cells, which shall be very light and cheap, which adds but little to the bulk of the apparatus, and wherein danger of short-circuiting through any moisture present from any cause is reduced to a minimum.

In order that the invention may be better understood, attention is directed to the accompanying drawings, forming part of this specification, and in which—

Figure 1 is a side elevation of a tray for holding four cells, showing the latter in dotted lines; Fig. 2, a cross-section on the line 2 2 of Fig. 1; Fig. 3, a plan view; Fig. 4, a separate perspective view of one of the insulating-locks for use between two of the cans for holding the same in position and electrically insulating them; Fig. 5, a corresponding view of one of the insulating-locks for use at the corner of each of the end cans; Fig. 6, a separate sectional view through one of the retaining-studs on the bottom of the tray; Fig. 7, a separate perspective view of one of the insulating-skirts for directly supporting each of the cans; and Fig. 8, an enlarged sectional view on the line 8 8 of Fig. 1, showing one of the cells partly in section.

In all of the above views corresponding parts are represented by the same numerals of reference.

The base 1 is provided with vertical ends 2 2, suitably strengthened by braces 3. Connecting the ends 2 at their tops are side braces 4 4, thereby practically forming a very strong box with a solid bottom and ends, with an open top, and with substantially open sides. Secured to the bottom 1 are blocks 5, each adapted to support one of the cells 6. On each side of the blocks 5 are formed channels 7 7, sloping from the center downwardly, as shown, so as to immediately carry off any water which may find its way to the bottom of the tray. The blocks 5 are provided with studs 8, (four being shown for each block,) and said studs are made, preferably, of thin insulating material nailed or screwed in place. Resting upon each of the blocks 5 is an insulating-skirt 9, provided with struck-up sockets 10 for engaging the studs 8, and by reason of which engagement the skirts will be retained firmly in position on the blocks 5. The downturned rim 11 of each skirt therefore overhangs the blocks 5, and any moisture which may accumulate on the skirts will find its way to the bottom edge of the rim 11 and drop or be shaken off without the possibility of permitting short-circuiting between the cells. The bottoms of the cells are formed with sockets or recesses 12, engaging the studs on the skirt 9 and formed by striking up the sockets 10, whereby the can at its bottom will be securely locked in position however severe may be the use to which the device is put. At their upper ends the cans are locked in place by means of locks 13, formed with a shoulder 14, fitting under the side brace 4, and with shoulders 15, fitting over the tops of the cans. While I prefer on account of cheapness to make use of blocks 5, carrying separate skirts 9, of insulating material, as explained, it will be understood that the same construction can be produced from a single cast block of porcelain or similar insulating material, in which case the insulating-block will be formed with an overhanging integral rim corresponding to the rim 11 and with integral studs or projections corresponding to the studs or projections 8. These locks are also provided with webs 16, which fit in between adjacent cans and electrically insulate them. The locks which are used at the corners are similarly constructed, (see Fig. 5,) except that the shoulders 14 and 15 only extend to one side of the web 16, as shown. Below the web 16 each of the locks is made somewhat thinner to form a shoulder 17, so as to prevent short-circuiting between the cans by the accumulation of moisture on the locks, since it will be noted that the cans are out of contact with the portion of each lock below the webs 16. In order to prevent short-circuiting between the cans through moisture accumulating on the bottoms of the webs 16, I form the webs with grooves 18 in their bottoms, so that any moisture accumulating on the sides of the webs 16 will be prevented from coalescing at the bottom to bridge the space between the cans. The entire device may be transported in any simple way; but I preferably provide each tray with side handles 19, engaging vertical holes in the sides 2 2 and held in place by pins 20.

It will be noted that the tray in itself is very light, strong, and compact and that the several cells are rigidly and securely held in position therein. It will furthermore be noted that means have been provided throughout for effectively insulating each can from its neighbors to prevent the possibility of short-circuiting due to moisture accumulating either on the cans themselves or on the tray.

I find in practice that the best results are secured when the tray is formed of cypress, as this wood appears to be less affected by alkaline solutions. In order to increase the capacity of the wood to resist the decomposing and softening influences of strong alkalies, I prefer to saturate the wood with paraffin or some other resisting hydrocarbon. The best way to apply the paraffin now known to me is to immerse the wood either in bulk or boards in a bath of paraffin maintained by heat in a molten condition and in the presence of a partial vacuum produced by a vacuum-pump. Under these conditions the air within the cells of the wood appears to be withdrawn or is driven out by the heat and the molten paraffin enters to take its place, so that the wood becomes thoroughly saturated. If, on the other hand, the wood is merely dipped in molten paraffin, the coating secured appears to be practically superficial and does not penetrate much within the surface.

Having now described my invention, what I claim as new therein, and desire to secure by Letters Patent, is as follows:

1. The combination with a series of cells, of a tray for receiving the same, means for supporting the cells and for insulating the cells from each other at their bottoms, and means at the top of the cells for locking them in position in said tray, substantially as set forth.

2. The combination with a series of cells, of a tray for receiving the same, having a series of pedestals or blocks on its bottom, each adapted to support one of the cells, and means at the tops of the cells for locking them in position in said tray, substantially as set forth.

3. The combination with a series of cells, of a tray for receiving the same, having a series of pedestals or blocks on its bottom, each adapted to support one of the cells, and means at the tops of the cells for locking them in position in the tray and electrically insulating them at their upper ends, substantially as set forth.

4. The combination with a series of cells, of a tray for receiving the same, having a series of pedestals or blocks on its bottom, each adapted to support one of the cells, and an overhanging rim independent of the cells and secured to the block and extending completely around the same, substantially as set forth.

5. The combination with a series of cells, of a tray for receiving the same, having a series of pedestals or blocks on its bottom, each adapted to support one of the cells, and an insulating-skirt between each cell and the corresponding block or pedestal and independent of the cell, substantially as set forth.

6. The combination with a series of cells, of a tray for receiving the same, having a series of pedestals or blocks on its bottom, each adapted to support one of the cells, an insulating-skirt independent of the cells and arranged between each of the cells and the corresponding block or pedestal, and grooves forming discharging-channels in the bottom of the tray between the blocks or pedestals, substantially as set forth.

7. The combination with a series of cells, of a tray for supporting the same, having on its bottom a series of blocks or pedestals, one for each cell, a stud on each block, and an insulating-skirt between each cell and the corresponding supporting-block, the skirt being formed with a struck-up socket engaging over said stud and engaging a recess in the bottom of the cell, substantially as set forth.

8. The combination with a series of cells, of a tray for supporting the same, having slatted side braces, and locks engaging beneath said side braces and engaging the tops of the cells, substantially as set forth.

9. The combination with a series of cells, of a tray for supporting the same, having slatted side braces, locks engaging beneath said side braces and engaging the tops of the cells, and webs on said locks for electrically insulating the cells, substantially as set forth.

10. The combination with a series of cells, of a tray for supporting the same, having slatted side braces, locks engaging beneath said side braces and engaging the tops of the cells, and a groove formed in the bottom of each web, substantially as set forth.

11. The combination with a series of cells, of a tray for supporting the same, having slatted side braces, locks engaging beneath said side braces and engaging the tops of the cells, and a shoulder formed substantially in line with the bottom of each web, substantially as set forth.

12. The combination with a series of cells, of a tray for supporting the same, having blocks or pedestals on its bottom for supporting the cells and insulating-locks for securing the cells at their upper ends within the tray, substantially as set forth.

This specification signed and witnessed this 13th day of November, 1902.

THOS. A. EDISON.

Witnesses:
FRANK L. DYER,
J. F. RANDOLPH.